United States Patent [19]
Miller

[11] Patent Number: 4,548,637
[45] Date of Patent: Oct. 22, 1985

[54] SERVO-CONTROL OF MACHINE MOTIONS IN MANUFACTURE OF GLASS CONTAINERS

[75] Inventor: Peter S. Miller, Waterville, Ohio

[73] Assignee: Owens-Illinois, Inc., Toledo, Ohio

[21] Appl. No.: 645,639

[22] Filed: Aug. 30, 1984

[51] Int. Cl.$^4$ .............................................. C03B 7/16
[52] U.S. Cl. ........................................ 65/163; 65/159; 65/160; 65/DIG. 13; 364/473; 364/476
[58] Field of Search ................ 65/29, 158, 159, 163, 65/DIG. 13, 160; 364/473, 476

[56] References Cited

U.S. PATENT DOCUMENTS

| | | | |
|---|---|---|---|
| 4,203,752 | 5/1980 | Becker et al. | 65/163 |
| 4,266,961 | 5/1981 | Wood | 65/163 |
| 4,313,750 | 2/1982 | Lulejian et al. | 65/163 X |
| 4,367,087 | 1/1983 | Cardenas-Franco et al. | 65/163 |
| 4,427,431 | 1/1984 | Mumford et al. | 65/158 X |
| 4,445,923 | 5/1984 | Shetterly | 65/163 X |
| 4,453,963 | 6/1984 | Larson et al. | 65/159 X |
| 4,461,637 | 7/1984 | Jones et al. | 65/158 |

FOREIGN PATENT DOCUMENTS

WO82/00051 2/1982 PCT Int'l Appl. .

OTHER PUBLICATIONS

Barrow, "Applying Programmable Controllers in the Glass Industry", (Source and date unknown).
Sidler, "The Glass Container Inspection System—New and Broader Approach", *Glass*, Nov. 1982, pp. 434-437.

Primary Examiner—Arthur Kellogg
Attorney, Agent, or Firm—John R. Nelson

[57] ABSTRACT

A servo control system and method for controlling repetitious or oscillatory motion of a member in a glass manufacturing process between predetermined points. A desired trajectory between such points is first established as a function of time, and this trajectory is then loaded into a digital electronic memory as a plurality of discrete trajectory position signals arranged in an incremental series as a function of time. Control logic, which includes a real time oscillator, periodically accesses the memory so as to sequentially select and read therefrom the incremental trajectory position signals. These incremental signals are fed as a desired position control signal to a servo amplifier, which receives a second input from a position transducer coupled to the movable member and provides an amplifier output to a servo motor and then to the member.

5 Claims, 5 Drawing Figures

SERVO-CONTROL OF MACHINE MOTIONS IN MANUFACTURE OF GLASS CONTAINERS

The present invention relates to manufacture of glass containers, and more particularly to servo systems and methods for precisely controlling repetitious machine motions in such systems.

BACKGROUND OF THE INVENTION

In the manufacture of glass containers, such as bottles and jars, a number of machine motions are involved, precise control of which is desirable for efficient high quality operation. Such motions include, for example, forming and severing of the glass gob, moving of the parison and container, opening and closing of the blow mold, in and out motions of the funnel, baffle and blow head, and motions of the lehr-loading devices. Repeatability and stability of pneumatic cylinders are inadequate, due primarily to variations in friction. Prior art attempts at electronic servo-control, such as those disclosed in U.S. Pat. No. 4,203,752, have not been as satisfactory as desired in improving upon conventional piston-driven motions. In particular, use of limit switches and like devices, which are subject to wear, limits adjustability and control, and leads to defective containers and increases scrap rate.

OBJECTS AND SUMMARY OF THE INVENTION

A general object of the present invention is to provide a servo method and system for precisely controlling repetitious motions in manufacture of glass containers which are readily adjustable, which are readily adaptable for a wide variety of repetitious motions in glass container manufacture, which accommodate and account for wear of moving parts and variable friction, and which reduce defects and scrap rate.

In accordance with the present invention, a servo control system and method are provided for controlling repetitious or oscillatory motions of a member in a glass manufacturing process between predetermined end points. A desired trajectory between such end points is first established as a function of time, taking into consideration such variables as inertia and fragility of the glass at the particular stage of manufacture. This trajectory is then stored in a memory, preferably a digital electronic memory, as a plurality of discrete trajectory position signals arranged in an incremental series as a function of time. Control logic, which includes an oscillator, periodically accesses the memory so as to read therefrom the incremental trajectory position signals in sequence. These incremental signals are fed as a desired position control signal to a servo amplifier.

The servo amplifier receives a second input from a position transducer coupled to the movable member and provides an amplifier output to a servo motor. Preferably, the servo amplifier also receives an input from a velocity transducer coupled to the drive member. The servo motor preferably comprises a dc torque motor, and preferably is directly coupled to the movable member.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The drawings and the following description disclose a presently preferred embodiment of the invention for controlling motion of an invert arm 10 (FIG. 1) which grips and inverts orientation of the parison 12 during the process of manufacturing a glass container. It will be understood, however, that the principles of the invention are not in any way limited to use in conjunction with a parison invert arm, but may be employed with little or no modification to control of other machine motions in glass container manufacturing systems and processes.

Figure 1:
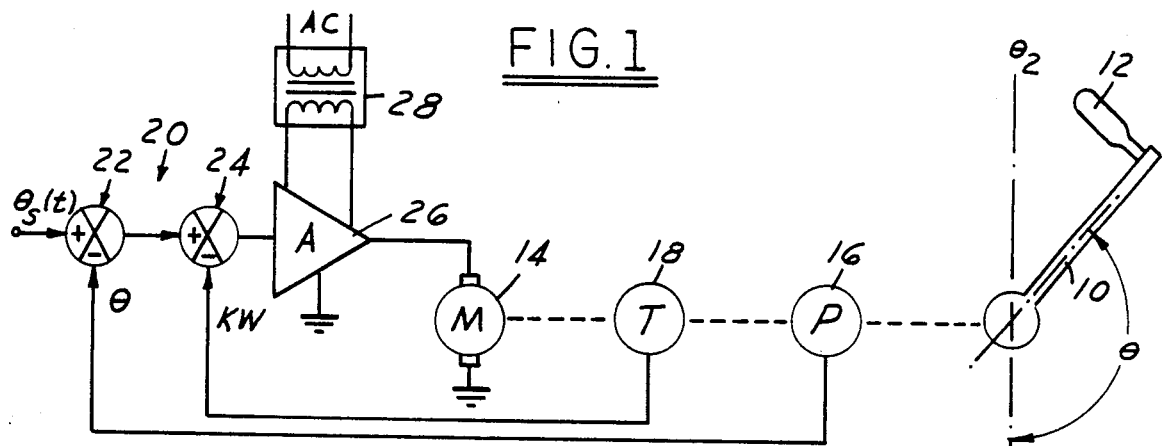
FIG. 1 is an electrical schematic diagram of a servo motor and feedback control system for controlling motion of a movable member in a glass manufacturing process in accordance with the present invention.

Referring to FIG. 1, arm 10 is coupled to a drive motor 14 for motion between predetermined position end points $\theta_1$ and $\theta_2$. Preferably, motor 14 comprises a dc torque motor which is directly coupled to the shaft of arm 10 and traverses less than one motor revolution for each motion of arm 10 between limits $\theta_1$ and $\theta_2$. A position transducer 16 is coupled to arm 10 and provides a signal $\theta$ indicative of actual arm position. Preferably, a velocity transducer 18, such as a tachometer, is also coupled to arm 10 and provides a signal $k\omega$ indicative of arm velocity. A servo amplifier circuit 20 includes a first summer 22 which receives a minus input $\theta$ from transducer 16 and a plus set point $\theta_s(t)$. A second summer 24 receives a plus input from the output of summer 22 and a minus input $k\omega$ from transducer 18. The output of summer 24 is connected to the input of a servo amplifier 26, which receives a power input from an ac transformer 28 and provides a drive output to dc torque motor 14. The output of summer 22 is thus responsive to a difference between desired arm position $\theta_s(t)$ and actual position $\theta$. The output of amplifier 26 is a function of the difference $\theta_s(t) - \theta - k\omega$.

Use of a dc torque motor 14 (high torque, low speed) permits the coupling ratio between the motor-tachometer-position transducer ensemble 14,16,18 and the invert arm 10 to be less than one revolution of the motor per traverse of the invert arm between end points $\theta$ and $\theta_2$. Such a small ratio permits more compact and rugged transmission design. It also allows the rotor in the position and velocity transducers to share a single shaft, which is best for rigidity of coupling, while keeping the motor rotation under a single revolution. With this arrangement, the position transducer can be of the absolute position-indicating type with a span of 360° or slightly less. A high speed servo motor can be used, but typically requires five to ten revolutions for one-half revolution of the invert arm shaft. If the position transducer is mounted directly to the motor shaft in such an arrangement, electronic counting is needed to keep track of invert arm position, and the potential exist for loosing track of the count. If the position transducer is geared down so as to make less than one revolution, rigidity of coupling between motor shaft and transducer degrades, primarily because of backlash, causing loop instability.

Figure 2A:
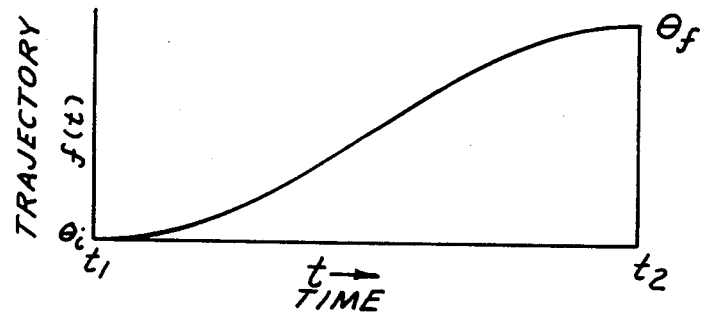
FIGS. 2A and 2B are graphs which respectively illustrate member trajectory and desired position versus time in accordance with the present invention.
Figure 2B:
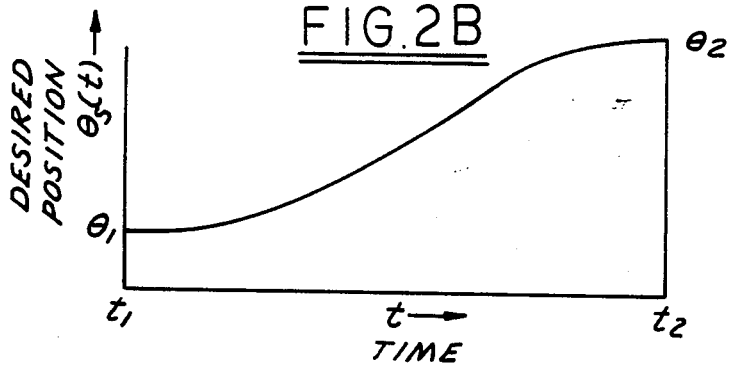

Invert arm 10 moves approximately 180° between the two path end point or rest positions $\theta_1$ and $\theta_2$ in the example of FIG. 1. The position-versus-time trajectory of each motion is preselected in accordance with the present invention to balance the forces acting on the hot glass parison 12, while at the same time obtaining rapid motion with minimum jerk. Thus strength of the glass parison, as well as inertia and acceleration capabilities of the motor arm and motor/arm interconnection, are all taken into consideration. The only constraint is that motion begins and ends at the respective end points at zero velocity. FIG. 2A illustrates a basic trajectory for arm 10 and parison 12 as the function f(t) which starts at position $\theta_i$ at time $t_1$, increases in velocity, and then decreases in velocity to final position $\theta_f$ at time $t_2$. FIG. 2B illustrates application of the general trajectory f(t) of FIG. 2A to the particular implementation of FIG. 1 wherein a desired position signal $\theta_s(t)$ must be generated to control motion of arm 10 between end points $\theta_1$ and $\theta_2$ during the time period $t_1-t_2$.

Figure 3:
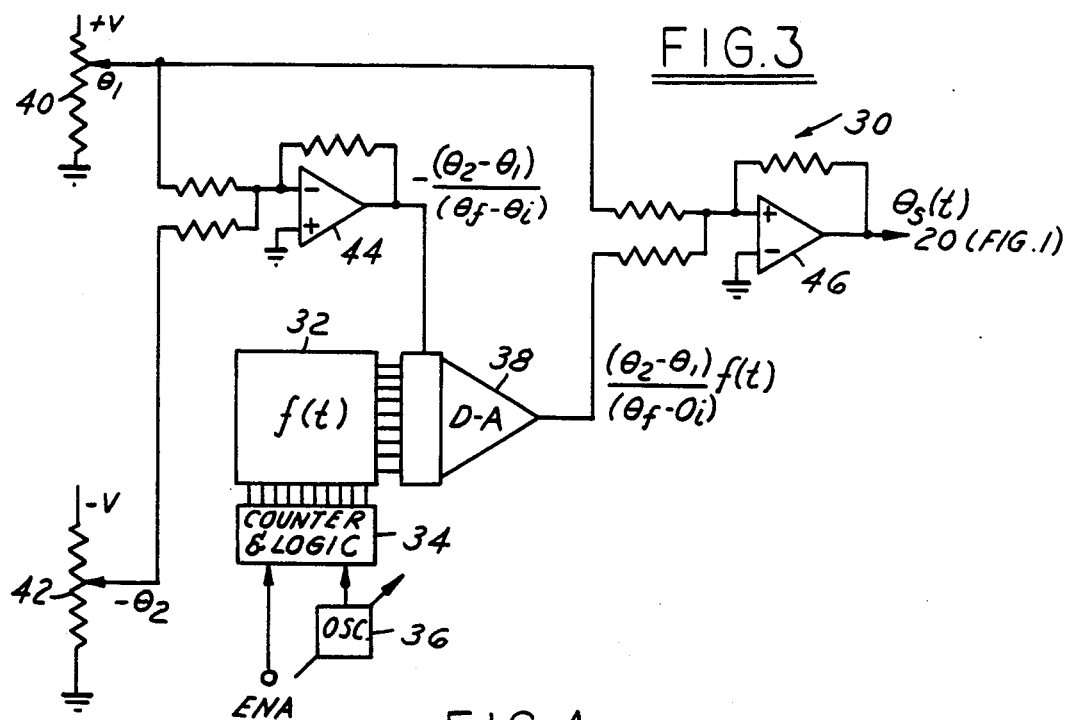
FIG. 3 is an electrical schematic diagram of a circuit for providing desired position control signals to the servo system of FIG. 1 in accordance with the principles of the present invention.

FIG. 3 is a schematic diagram of an electronic circuit 30 for providing the desired position signal $\theta_s(t)$ (FIG. 2B) to the servo amplifier circuit 20 in FIG. 1. Referring to FIG. 3, the trajectory f(t) is stored in an electronic memory 32 as a plurality of discrete trajectory position signals arranged in an incremental series as a function of time. Electronic memory 32 preferably comprises a digital memory, such as a read-only memory for a dedicated control circuit or a programmable memory for a control circuit of more general application. Memory 32 has address input lines connected to a counter 34 which includes logic responsive to an enable input ENA to initiate traversal of the invert arm. Counter 34 also receives and counts pulses/cycle from a variable frequency real time oscillator 36. The output of memory 32, which provides a digital indication of desired position, is connected to the input of a d/a converter 38.

A first variable resistor 40 is connected across a positive voltage source and is adapted to be manually adjusted by an operator to provide a positive first dc reference signal corresponding to arm end position $\theta_1$. A second variable resistor 42 is connected across a source of negative voltage to provide a second dc reference signal corresponding to the end position $\theta_2$. The wipers of resistors 40,42 are connected to a summing junction at the inverting input of an operational amplifier 44. The gain of amplifier 44 is adjusted so that the output thereof is indicative of the ratio $-(\theta_2-\theta_1)/(\theta_f-\theta_i)$, with $\theta_f$ and $\theta_i$ being constants. The output of amplifier 44 is connected to the reference input of d/a converter 38 so that the output thereof is equal to $$\frac{(\theta_2 - \theta_1)}{(\theta_f - \theta_i)} f(t).$$

Such output is summed with the $\theta_1$ reference voltage at the inverting input of the amplifier 46, so that the output thereof is represented by the equation:

$$\theta_s(t) = \theta_1 + \frac{(\theta_2 - \theta_1)}{(\theta_f - \theta_i)} f(t).$$

Such output is fed to the servo amplifier circuit 20 in FIG. 1.

In operation, upon receipt of an enable signal ENA, oscillator 36 functions in real time through counter 34 to periodically access memory 32 so as to read therefrom the incremental trajectory position signals in sequence. These incremental signals are fed in turn as desired position control signals $\theta_s(t)$ to the servo amplifier circuit 20 and control system of FIG. 1. The rate of traversal between end points $\theta_1$ and $\theta_2$ is, of course, controllable by means of the frequency of oscillator 36 which determines the time base between positions $t_2$ and $t_1$ in FIGS. 2A and 2B.

As a modification to the control circuit 30 of FIG. 3, end points $\theta_1$ and $\theta_2$ may be automatically selected and/or varied by an external computer and suitable d/a converters. Likewise, traversal of arm 10 may be different in the return direction where parison 12 is absent than in the forward direction, for example, by precomputing a suitable return directory in the manner of FIG. 2A and loading suitable trajectory position values into memory 32. Indeed, memory 32 may be remotely programmable, as by a remote control computer (not shown), for varying trajectory of arm 10 in any suitable manner. It is also contemplated that counter 34 may comprise a bi-directional counter so that arm 10 would traverse the trajectory illustrated in FIG. 2B in the reverse direction after parison 12 is removed.

Figure 4:
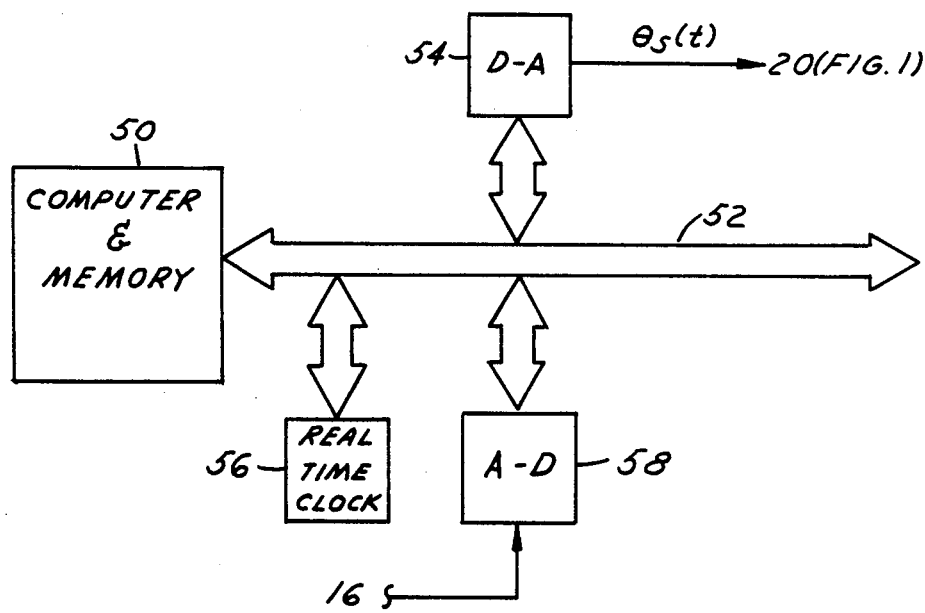
FIG. 4 is a fragmentary functional block diagram of an alternative embodiment of the invention.

FIG. 4 shows a modified computer-based embodiment of the invention for generating desired position signal $\theta_s(t)$. A central computer 50 having the trajectory (FIG. 2A) and end points $\theta_1,\theta_2$ stored therein internally generates the desired position control signal $\theta_s(t)$ (FIG. 2B) on a data bus 52. A d/a converter 54 is responsive thereto for providing the desired position signal $\theta_s(t)$ in analog form to the servo amplifier and control circuit of FIG. 1. Bus 52 may be connected to a plurality of such converters 54 for independently controlling motion of a corresponding plurality of parison invert arms 10. Speed control is facilitated by a real time clock 56. Invert arm position transducer 16 is connected through an a/d converter 58 to data bus 52 so that corrections in end points $\theta_1$ and $\theta_2$ can be made for wear and/or effects of thermal expansion.

The invention claimed is:

1. In a system for manufacture of glass containers, a servo system for controlling oscillatory motion of a member between predetermined end points $\theta_1$ and $\theta_2$, said system comprising a motor coupled to propel said member between said end points, a transducer coupled to said member to provide a signal indicative of actual member position $\theta$, and servo amplifier means for energizing said motor as a function of a difference between said actual position signal $\theta$ and a second signal $\theta_s(t)$ indicative of desired member position, means for providing said second signal $\theta_s(t)$ comprising memory means having stored therein a sequence of signals f(t) indicative of desired motion of said member along a preselected motion trajectory between trajectory end points $\theta_i$ and $\theta_f$, said signals being stored as incremental functions of time t, means for electronically translating said trajectory end points $\theta_i$ and $\theta_f$ to correspond with said predetermined end points $\theta_1$ and $\theta_2$, means including an oscillator for periodically accessing said memory means to provide sequential signals f(t) indicative of incremental desired position along said trajectory, and means responsive to said sequential signals f(t) and to said electronically translating means for directing said sequential signals $\theta_s(t)$ as a function thereof to said servo amplifier means on said second input.

2. The system set forth in claim 1 further comprising variable means for providing first and second control signals respectively indicative of said end points $\theta_1$ and $\theta_2$.

3. The system set forth in claim 2 wherein said translating means includes first amplifier means responsive to said first and second control signals for providing an output which varies as a function of $(\theta_2-\theta_1)/(\theta_f-\theta_i)$, multiplier means responsive to said first amplifier means and to said memory means for providing an output which varies as a function of $$\frac{(\theta_2 - \theta_1)}{(\theta_f - \theta_i)} f(t),$$

and second amplifier means responsive to said multiplier means and to said first signal to provide said sequential signals as a function of the equation $$\theta_s(t) = \theta_1 + \frac{(\theta_2 - \theta_1)}{(\theta_f - \theta_i)} f(t).$$

4. The system set forth in claim 3 wherein said memory means comprises digital memory means coupled to said real time oscillator means to provide sequential digital outputs indicative of said incremental positions, and wherein said amplifier means comprises a/d converter means responsive to said digital memory means and to said first amplifier means.

5. The system set forth in claim 4 wherein said motor comprises a dc torque motor having a motor output shaft directly coupled to said member to propel said member between said end points in less than one revolution of said shaft, said transducer being directly coupled to said member and said shaft.

* * * * *

UNITED STATES PATENT AND TRADEMARK OFFICE
CERTIFICATE OF CORRECTION

PATENT NO. : 4,548,637
DATED : October 22, 1985
INVENTOR(S) : Peter S. Miller

It is certified that error appears in the above-indentified patent and that said Letters Patent is hereby corrected as shown below:

Claim 1, column 5, line 4, replace "on" with --at--, and replace "input" with --signal--.

Signed and Sealed this

Twenty-ninth Day of July, 1997

Attest:

BRUCE LEHMAN

Attesting Officer

Commissioner of Patents and Trademarks